L. CLIFTON.
Cultivator.
No. 83,931.
Patented Nov. 10, 1868.
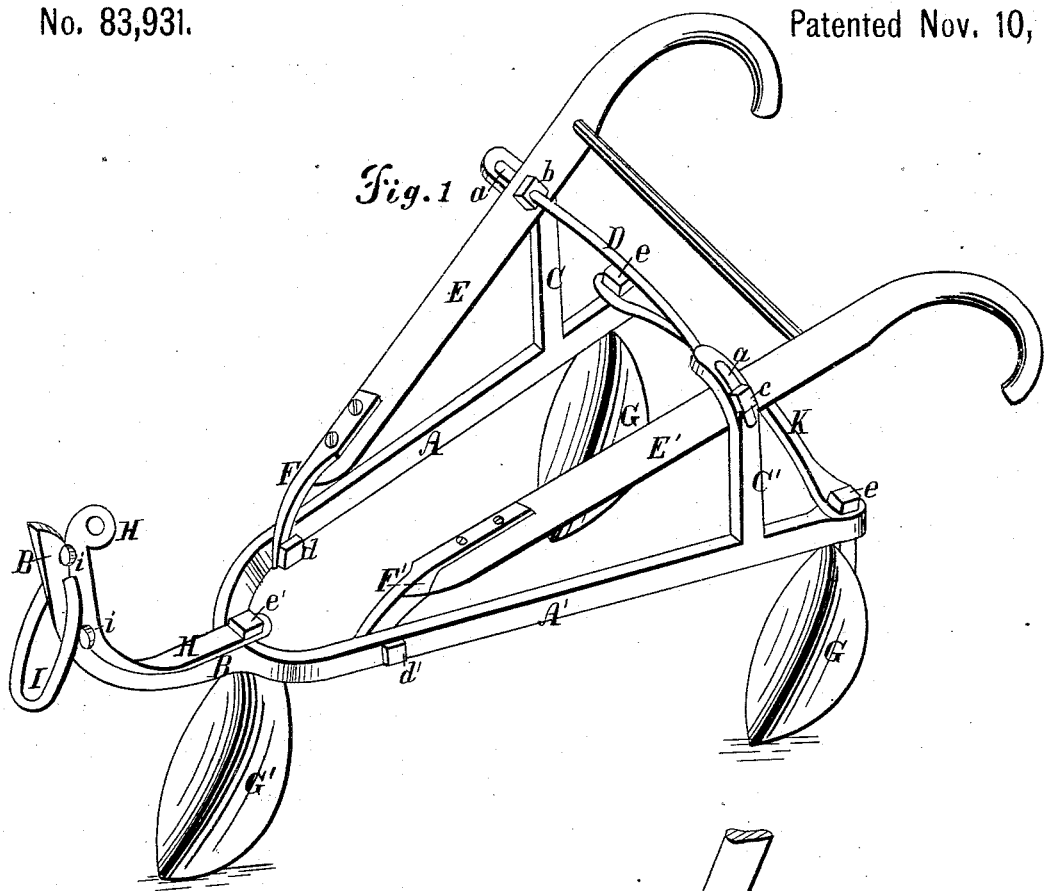
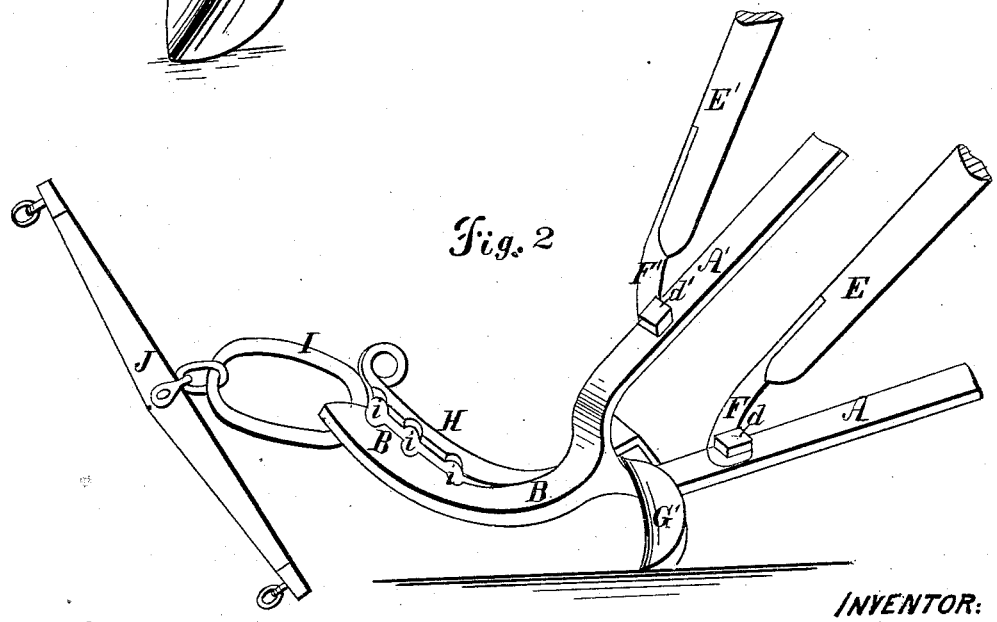
WITNESSES:
Samuel Smith
D. Durand
INVENTOR:
Leander Clifton
by Alex. A. C. Maucke & Co.
attorneys

LEANDER CLIFTON, OF BARRY, ILLINOIS.

Letters Patent No. 83,931, dated November 10, 1868.

IMPROVEMENT IN CULTIVATORS.

The Schedule referred to in these Letters Patent and making part of the same.

To all whom it may concern:

Be it known that I, LEANDER CLIFTON, of Barry, in the county of Pike, and State of Illinois, have invented new and useful Improvements in Cultivators; and I do hereby declare the following to be a full and correct description of the same, sufficient to enable others skilled in the art to which my invention appertains, to fully understand and construct the same, reference being had to the accompanying drawings, which make part of this specification, and in which—

Figures 1 and 2 are perspective views of my improved cultivator; and

Like letters of reference indicate like parts in both figures.

The nature of my invention consists, first, in a safety-spring clevis, formed on the forward part of the cultivator's body; also, in the manner of adjusting the handles to the size of the persons using the same; and, lastly, in the general construction of the cultivator in such a manner as to make it light and cheap, and, at the same time, strong.

The body or frame of my cultivator consists of the iron bow, A A', having an upwardly-bent or curved piece, B, formed on its forward end, and two standards, C C', on each arm A A' of the bow. These standards are, at their upper ends, bent forward, and are slotted at $a\ a'$, through which slots passes an iron rod, D, the ends of which pass through the handle E E', and are provided with screw-threads, on which nuts $b\ c$ move, the nuts $b$ on the inside of the handles E E', and the nuts $c$ on the outside of the slots $a\ a'$, thus securely holding the handles to the standards. The handles E E' are, at their forward ends, secured to iron pieces, F F', which are pivoted to the arms A A' of the bow, by nuts $d\ d'$, in such a manner that their attachment there can be made rigid or not, at pleasure.

The curved piece B projects a little to the rear of the front end of the bow, and is, as well as the ends of the arms A A', of the bow, provided with a hole, through which the standards of the cultivator-plows, G G', are passed, and secured by nuts $e\ e'$. The nut $e'$ secures, at the same time, a spring-piece, H, shaped like the curved piece B, and bearing firmly against the latter. Holes, $i$, are formed in the curved piece B and the spring-piece H, in such a manner that one-half of each hole is in the former and the other half in the latter, as clearly shown in the drawings.

K is a brace-iron, secured to each arm, A A', of the bow, by the nuts $e$ which fasten the plow G.

It is very frequently the case, especially in the prairie countries, that horses get startled by the passing trains, and run away, dragging the cultivator after them, and injuring their legs often in such a manner as to necessitate their being killed; and horses frequently start off suddenly while the laborer attending to the plow or cultivator leaves the latter for a moment to take a drink of water, or for any other purpose. To prevent the horse or horses injuring themselves by the sharp edges of the cultivator-plows, I construct my cultivator with a safety-spring clevis, acting automatically, as shown in fig. 2.

When the horse starts, the plow G' naturally buries itself in the ground, as no weight is then on the handles to equalize the draught between the three plows, G G G', and the cultivator is thrown over one side, the plow G forming, so to speak, an anchor, against which the running horse pulls. The power or tension of the spring-piece H being less than that of the resistance of the plow G' in the ground, the former gives way and allows the ring I, to which the whiffletree J is fastened, to slip off from piece B, as shown in fig. 2, and the horse can run off without danger of being injured by a cultivator-tooth, or plow dangling behind.

The adjustment of the handles E E' enables persons of different height and size to fasten the handles to a height to suit themselves, without changing them or taking them from the cultivator.

The only wood-work about the cultivator being the handles, all other parts can be easily constructed by any village blacksmith, and any parts easily replaced.

Having thus described my invention,

What I claim as new, and desire to secure by Letters Patent, is—

1. The safety-detaching device for a cultivator-plow, consisting of the curved piece B and spring-piece H, substantially as and for the purposes described.

2. The cultivator, constructed of the iron bow A A', curved piece B, spring-piece H, ring I, pieces F F', standards C C', having bent and slotted ends $a\ a'$, rod D, nuts $b\ c$, brace K, and plows G G', all combined, arranged, and operating as and for the purposes described.

The above specification of my improvement in cultivators signed, this 24th day of August, 1868.

<div style="text-align: right;">LEANDER CLIFTON.</div>

Witnesses:
ALEXR. A. C. KLAUCKE,
SAMUEL SMITH.